United States Patent
Kanno et al.

(10) Patent No.: US 7,315,441 B2
(45) Date of Patent: *Jan. 1, 2008

(54) FLAME-RETARDANT ELECTROLYTE ELECTROLYTIC CAPACITOR

(75) Inventors: Hiroshi Kanno, Kodaira (JP); Masashi Otsuki, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 237 days.

This patent is subject to a terminal disclaimer.

(21) Appl. No.: 10/537,289

(22) PCT Filed: Nov. 26, 2003

(86) PCT No.: PCT/JP03/15079

§ 371 (c)(1),
(2), (4) Date: Jun. 1, 2005

(87) PCT Pub. No.: WO2004/051679

PCT Pub. Date: Jun. 17, 2004

(65) Prior Publication Data

US 2006/0098391 A1    May 11, 2006

(30) Foreign Application Priority Data

Dec. 3, 2002 (JP) ............................. 2002-351699

(51) Int. Cl.
*H01G 9/00* (2006.01)
(52) U.S. Cl. ...................... 361/523; 361/525; 361/528; 361/529; 361/534; 29/25.01; 29/25.03

(58) Field of Classification Search ........ 361/523–528, 361/529–534, 516–519, 543, 502–512; 29/25.01, 29/25.03
See application file for complete search history.

(56) References Cited

U.S. PATENT DOCUMENTS

| | | | | |
|---|---|---|---|---|
| 5,780,185 | A * | 7/1998 | Oki et al. ................. | 429/231.2 |
| 6,094,338 | A * | 7/2000 | Hirahara et al. ............ | 361/502 |
| 6,152,970 | A * | 11/2000 | Wei et al. ................... | 29/25.03 |
| 6,424,517 | B1 * | 7/2002 | Ikeda et al. ................. | 361/502 |
| 6,452,782 | B1 * | 9/2002 | Otsuki et al. ............... | 361/504 |
| 6,469,888 | B1 * | 10/2002 | Otsuki et al. ............... | 361/502 |
| 6,710,999 | B2 * | 3/2004 | Kawasato et al. .......... | 361/502 |

FOREIGN PATENT DOCUMENTS

| | | |
|---|---|---|
| JP | 2001-335590 A | 12/2001 |
| JP | 2002-249742 A | 9/2002 |

* cited by examiner

*Primary Examiner*—Nguyen T. Ha
(74) *Attorney, Agent, or Firm*—Sughrue Mion Pllc.

(57) ABSTRACT

The invention relates to an electrolytic capacitor having a flame retardant electrolyte and a high safety even if the electrolyte leaks out to outside, and more particularly to an electrolytic capacitor comprising a positive electrode provided with an insulating oxide layer formed through anodic oxidation, a negative electrode, a separator and an electrolyte containing a solute in an organic solvent, characterized in that the electrolyte contains not less than 3% by mass of a phosphazene derivative and/or an isomer of a phosphazene derivative.

11 Claims, No Drawings

FLAME-RETARDANT ELECTROLYTE ELECTROLYTIC CAPACITOR

TECHNICAL FIELD

This invention relates an electrolytic capacitor, particularly a flame-retardant electrolytic capacitor.

BACKGROUND ART

The electrolytic capacitor is a condenser using as a dielectric an insulating oxide layer formed by subjecting a surface of a metal foil such as aluminum or tantalum to an electrolytic oxidation treatment to form the insulating oxide layer, and is large in the capacitance because the accessible electrode area and the dielectric constant of the insulating film are large.

The usual aluminum electrolytic capacitor element using aluminum is a structure wherein a band-shaped positive electrode foil having an insulating oxide layer formed through anodic oxidation and a band-shaped negative electrode foil having no insulating oxide layer are cylindrically wound through a separator, or a structure in which the separator is sandwiched between the positive electrode and the negative electrode and they are alternately laminated or folded. The electrolytic capacitor element is impregnated with an electrolyte and placed in an armored casing and further an opening portion of the armored casing is hermetically sealed with a sealing material to form an electrolytic capacitor. As the electrolyte is usually used a solution obtained by dissolving boric acid or carboxylic acid, or an ammonium salt thereof in an organic solvent such as ethylene glycol, N,N-dimethyl formamide, γ-butyrolactone or the like.

In the above electrolytic capacitor, as the internal pressure of the element rises due to heat, overpotential or the like, there may be caused a case that the electrolyte leaks out from the sealed portion, or an explosion-proof valve is actuated to blow out the electrolyte. In this case, there is a possibility that the leaked electrolyte is ignited by a spark due to the short-circuiting of the electrolytic capacitor itself or a spark from the other electronic part to damage the device or cause the fire. Recently, electronics devices utilizing the electrolytic capacitor become widely used even in general households. For this end, it is demanded to develop electrolytes having a high safety even if the electrolyte is leaked to outside due to the troubles of the electrolytic capacitor. However, the aforementioned solution of boric acid or carboxylic acid or the ammonium salt thereof in the organic solvent has a problem that the safety is insufficient.

On the other hand, as a flame retarder for plastics are known phosphorus compounds, halogen compounds, antimony oxide and the like, but when the flame retardance is given to the electrolyte, it is important that the basic performances of the electrolyte (service temperature range, conductivity, spark voltage, compatibility to electrode and so on) are not lowered. For example, it is generally considered that solid materials lower the conductivity and halides corrode the electrode and hence they can not be included in the electrolyte. With this in mind, there is proposed a technique that non-halogen phosphoric ester is added to the electrolyte to improve the flame retardance of the electrolytic capacitor (see Japanese Patent No. 2611262). However, the flame retardance is insufficient even in this electrolytic capacitor in accordance with use environments, so that it is demanded to develop electrolytic capacitors further improving the flame retardance.

DISCLOSURE OF THE INVENTION

It is an object of the invention to provide an electrolytic capacitor having a flame-retardant electrolyte with a high safety even if the electrolyte is leaked to outside by giving a flame retardance higher than the conventional one to the electrolyte.

The inventors have made various studies in order to achieve the above object and found that the flame retardance of the electrolyte is further improved by adding a phosphazene derivative and/or an isomer thereof to the electrolyte as compared with the conventional one and hence the safety of the electrolytic capacitor is considerably improved, and as a result, the invention has been accomplished.

That is, the electrolytic capacitor of the invention is an electrolytic capacitor comprising a positive electrode provided with an insulating oxide layer formed through anodic oxidation, a negative electrode, a separator and an electrolyte containing a solute in an organic solvent, characterized in that the electrolyte contains not less than 3% by mass of a phosphazene derivative and/or an isomer of a phosphazene derivative.

In a preferable embodiment of the electrolytic capacitor of the invention, the electrolyte contains not less than 5% by mass of the phosphazene derivative and/or the isomer of the phosphazene derivative. It is further preferable that the electrolyte contains not less than 10% by mass of the phosphazene derivative and/or the isomer of the phosphazene derivative.

The phosphazene derivative is preferable to have a viscosity at 25° C. of not more than 100 mPa·s (100 cP) and be represented by the following formula (I) or (II):

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond)

(wherein $R^4$ is independently a monovalent substituent or a halogen element, and n is 3-15).

Among the phosphazene derivatives of the formula (II), a phosphazene derivative represented by the following formula (III) or (IV) is particularly preferable:

(wherein n is 3-13)

(wherein $R^5$ is independently a monovalent substituent or fluorine provided that at least one of all $R^5$s is a fluorine-containing monovalent substituent or fluorine and all $R^5$s are not fluorine, and n is 3-8).

As the phosphazene derivative, it is also preferable to be a phosphazene derivative being a solid at 25° C. and represented by the following formula (V):

$$(NPR^6{}_2)_n \quad (V)$$

(wherein $R^6$ is independently a monovalent substituent or a halogen element and n is 3-6).

As the isomer of the phosphazene derivative, it is preferable to be an isomer represented by the following formula (VI) and of a phosphazene derivative represented by the following formula (VII):

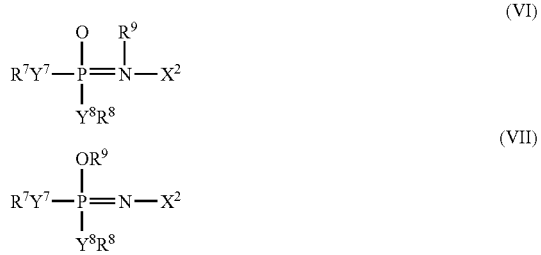

(In the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond.)

In another preferable embodiment of the electrolytic capacitor of the invention, the electrolyte contains an organic solvent having a dielectric constant at 25° C. of not less than 30. Particularly, the electrolyte is preferable to contain γ-butyrolactone and/or ethylene glycol.

In the other preferable embodiment of the electrolytic capacitor of the invention, a total ratio of an element(s) selected from the group consisting of aluminum, tantalum and niobium in the positive electrode is not less than 95% by mass.

BEST MODE FOR CARRYING OUT THE INVENTION

The invention will be described in detail below. The electrolytic capacitor of the invention comprises a positive electrode provided with an insulating oxide layer formed through anodic oxidation, a negative electrode, a separator and an electrolyte containing a solute in an organic solvent. In this case, the electrolyte comprises the organic solvent, the solute and a phosphazene derivative and/or an isomer of a phosphazene derivative.

The reason why the electrolyte contains the phosphazene derivative and/or the isomer thereof is as follows. That is, there is a risk in the conventional technique that as the internal pressure of the electrolytic capacitor rises due to heat, overpotential or the like, the electrolyte leaks out from the sealed portion or the explosion-proof valve is actuated to blow out the electrolyte and the leaked electrolyte is ignited or fired. On the contrary, phosphorus constituting the phosphazene derivative or the isomer thereof has an action of suppressing the chain decomposition of the high molecular weight material constituting the electrolytic capacitor, so that the risk of ignition-fire can be effectively reduced by including the phosphazene derivative and/or the isomer thereof to the conventional electrolyte. Also, the halogen (e.g. fluorine)-containing phosphazene derivative and/or the isomer thereof serves as an agent for catching active radical in the worst burning and has an effect of shielding oxygen because organic substituent forms a carbide (char) on the separator in the burning.

As the phosphazene derivative and the isomer thereof, it is preferable to have a substituent including a halogen element in its molecular structure. When the substituent including the halogen element is existent in the molecular structure, it is possible to more effectively improve the safety of the electrolyte. Moreover, it has been considered that the halide can not been added to the electrolyte directly contacting with the electrode because it corrodes the electrode. In the case of the phosphazene derivative and the isomer thereof, however, phosphorus element in the molecular structure catches a halogen radical to form a stable phosphorus halide without dissociation of halogen, so that no corrosion of the electrode is caused. Also, the phosphazene derivative and the isomer thereof are high in the decomposition potential and take a wide potential window, so that when they are used in the electrolytic capacitor, the electrolyte is not decomposed and the electric characteristics do not lower.

The content of the halogen element in the phosphazene derivative and the isomer thereof is preferably 2-80% by mass, more preferably 2-60% by mass, further preferably 2-50% by mass. When the content is less than 2% by mass, the effect by including the halogen element may not sufficiently appear, while when it exceeds 80% by mass, the electric conductivity may lower. As the halogen element, fluorine, chlorine, bromine and the like are preferable, and fluorine is particularly preferable.

As the phosphazene derivative, it is preferable to be a phosphazene derivative having a viscosity at 25° C. of not more than 100 mPa·s (100 cP), more preferably not more than 10 mPa·s and represented by the formula (I) or (II).

In the formula (I), $R^1$, $R^2$ and $R^3$ are not particularly limited as far as they are a monovalent substituent or a halogen element. As the monovalent substituent are mentioned an alkoxy group, a phenoxy group, an alkyl group, a carboxyl group, an acyl group, an aryl group and the like. As the halogen element are preferably mentioned fluorine, chlorine, bromine and the like. All of $R^1$-$R^3$ may be the same kind of the substituent, or some of them may be different kinds of the substituents.

As the alkoxy group are mentioned, for example, methoxy group, ethoxy group, propoxy group, butoxy group and the like, or an alkoxy-substituted alkoxy group such as methoxyethoxy group, methoxyethoxyethoxy group or the like. Among them, methoxy group, ethoxy group, methoxyethoxy group or methoxyethoxyethoxy group is preferable as all of $R^1$-$R^3$, and methoxy group or ethoxy group is particularly preferable in a point that the viscosity is low.

As the alkyl group are mentioned methyl group, ethyl group, propyl group, butyl group, pentyl group and the like. As the acyl group are mentioned formyl group, acetyl group, propionyl group, butyryl group, isobutyryl group, valeryl group and the like. As the aryl group are mentioned phenyl group, tolyl group, naphthyl group and the like.

In these monovalent substituents, a hydrogen element is preferable to be substituted with a halogen element. As the halogen element are preferably mentioned fluorine, chlorine, bromine and the like.

In the formula (I), as the bivalent connecting group shown by $Y^1$, $Y^2$ and $Y^3$ are mentioned, for example, $CH_2$ group and monovalent connecting groups each containing at least one element selected from the group consisting of oxygen, sulfur, selenium, nitrogen, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group and the bivalent connecting group containing at least one element selected from the group consisting of oxygen, sulfur, selenium and nitrogen are preferable. Also, $Y^1$, $Y^2$ and $Y^3$ may be a bivalent element such as oxygen, sulfur, selenium or the like, or a single bond. In a point that the safety of the electrolyte is considerably improved, the bivalent connecting group containing sulfur and/or selenium, sulfur element and selenium element are particularly preferable. All of $Y^1$-$Y^3$ may be the same, or some of them may be different.

In the formula (I), $X^1$ is preferable to be an organic group containing at least one element selected from the group consisting of carbon, silicon, nitrogen, phosphorus, oxygen and sulfur from a viewpoint of the toxicity and the environmental consciousness. Among these organic groups, it is preferable to be an organic group having a structure shown by the following formula (VIII), (IX) or (X):

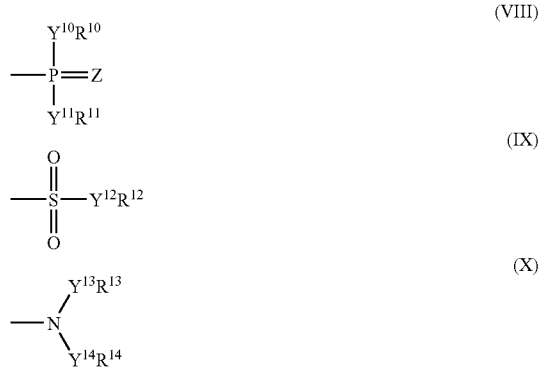

provided that in the formulae (VIII), (IX) and (X), $R^{10}$-$R^{14}$ are a monovalent substituent or a halogen element, $Y^{10}$-$Y^{14}$ are a bivalent connecting group, a bivalent element or a single bond, and Z is a bivalent group or a bivalent element.

In the formulae (VIII), (IX) and (X), as $R^{10}$-$R^{14}$ are preferably mentioned the same monovalent substituents or halogen elements as described in $R^1$-$R^3$ of the formula (I). Also, they may be the same kind in the same organic group, or some of them may be different kinds. Further, $R^{10}$ and $R^{11}$ in the formula (VIII), or $R^{13}$ and $R^{14}$ in the formula (X) mat be bonded to each other to form a ring.

As the group shown by $Y^{10}$-$Y^{14}$ in the formulae (VIII), (IX) and (X) are mentioned the same bivalent connecting groups, bivalent elements or the like as described in $Y^1$-$Y^3$ of the formula (I). Similarly, the group containing sulfur and/or selenium element is particularly preferable because the risk of ignition-fire in the electrolyte is reduced. They may be the same in the same organic group, or some of them may be different.

As Z in the formula (VIII) are mentioned, for example, $CH_2$ group, CHR group (R is an alkyl group, an alkoxyl group, phenyl group or the like, which is same hereinafter), NR group, and bivalent groups each containing at least one element selected from the group consisting of oxygen, sulfur, selenium, boron, aluminum, scandium, gallium, yttrium, indium, lanthanum, thallium, carbon, silicon, titanium, tin, germanium, zirconium, lead, phosphorus, vanadium, arsenic, niobium, antimony, tantalum, bismuth, chromium, molybdenum, tellurium, polonium, tungsten, iron, cobalt and nickel. Among them, $CH_2$ group, CHR group, NR group and bivalent group containing at least one element selected from the group consisting of oxygen, sulfur and selenium are preferable. Particularly, the bivalent group containing sulfur and/or selenium is preferable because the risk of ignition-fire in the electrolyte is reduced. Also, Z may be a bivalent element such as oxygen, sulfur, selenium or the like.

Among these organic groups, a phosphorus-containing organic group as shown in the formula (VIII) is particularly preferable in a point that the risk of ignition-fire can be reduced effectively. Also, a sulfur-containing group as shown in the formula (IX) is particularly preferable in a point that the interfacial resistance of the electrolyte is made small.

In the formula (II), $R^4$ is not particularly limited as long as it is a monovalent substituent or a halogen element. As the monovalent substituent are mentioned an alkoxy group, a phenoxy group, an alkyl group, a carboxyl group, an acyl group, an aryl group and the like. Among them, the alkoxy group and phenoxy group are particularly preferable. As the halogen element are preferably mentioned fluorine, chlorine, bromine and the like. As the alkoxy group are mentioned, for example, methoxy group, ethoxy group, methoxyethoxy group, propoxy group and the like. Among them, methoxy group, ethoxy group and methoxyethoxy group are particularly preferable. In these substituents, a hydrogen element is preferable to be substituted with a halogen element, and as the halogen element are preferably mentioned fluorine, chlorine, bromine and the like.

It is possible to synthesize phosphazene derivatives having more preferable viscosity, solubility suitable for addition and mixing and the like by properly selecting $R^1$-$R^4$, $R^{10}$-$R^{14}$, $Y^1$-$Y^3$, $Y^{10}$-$Y^{14}$ and Z in the formulae (I), (II) and (VIII)-(X). These phosphazene derivatives may be used alone or in a combination of two or more.

Among the phosphazene derivatives of the formula (II), a phosphazene derivative represented by the formula (III) is particularly preferable. In the formula (III), n is preferable to be 3-4, more preferably 3. When the value of n is small, the boiling point is low and the property of preventing ignition in the approaching to flame can be improved. On the other hand, as the value of n becomes large, the boiling point becomes higher, so that it can be stably used even at a higher temperature. In order to obtain target performances by utilizing such properties, it is possible to properly select and use a plurality of phosphazene derivatives.

Also, among the phosphazene derivatives of the formula (II), a phosphazene derivative represented by the formula (IV) is preferable. As the monovalent substituent in the formula (IV) are mentioned an alkoxy group, an alkyl group, an acyl group, an aryl group, a carboxyl group and the like. The alkoxy group is preferable in a point that it is particularly excellent in the improvement of the safety in the electrolyte. As the alkoxy group are mentioned methoxy group, ethoxy group, n-propoxy group, i-propoxy group, butoxy group and the like, or an alkoxy-substituted alkoxy group such as methoxyethoxy group or the like. Among them, methoxy group, ethoxy group and n-propoxy group are particularly preferable in a point that they are excellent in the improvement of the safety in the electrolyte. Also, methoxy group is preferable in a point that the viscosity of the electrolyte is made small. In the formula (IV), n is preferable to be 3-4 in a point that an excellent safety can be given to the electrolyte. The monovalent substituent is preferable to be substituted with fluorine. When all $R^5$s in the formula (IV) are not fluorine, at least one monovalent substituent contains fluorine. The content of fluorine in the phosphazene derivative of the formula (IV) is preferably 3-70% by weight, more preferably 7-45% by weight.

As the above phosphazene derivative, it is preferable to be a phosphazene derivative being solid at 25° C. (room temperature) and represented by the formula (V). In the formula (V), $R^6$ is not particularly limited as long as it is a monovalent substituent or a halogen element. As the monovalent substituent are mentioned an alkoxy group, an alkyl group, a carboxyl group, an acyl group, an aryl group and the like. As the halogen element are preferably mentioned halogen elements such as fluorine, chlorine, bromine, iodine and the like. Among them, the alkoxy group is preferable in a point that the rise of the viscosity in the electrolyte can be suppressed. As the alkoxy group, methoxy group, ethoxy group, methoxyethoxy group, propoxy group (isopropoxy group, n-propoxy group), phenoxy group, trifluoroethoxy group and the like are preferable, particularly methoxy group, ethoxy group, propoxy group (isopropoxy group, n-propoxy group), phenoxy group and trifluoroethoxy group are preferable in a point that the rise of the viscosity in the electrolyte can be suppressed. The monovalent substituent is preferable to contain the aforementioned halogen element. In the formula (V), n is particularly preferable to be 3-4 in a point that the rise of the viscosity in the electrolyte can be suppressed.

As the phosphazene derivative of the formula (V), a structure of the formula (V) wherein $R^6$ is methoxy group and n is 3, a structure of the formula (V) wherein $R^6$ is at least methoxy group or phenoxy group and n is 4, a structure of the formula (V) wherein $R^6$ is ethoxy group and n is 4, a structure of the formula (V) wherein $R^6$ is isopropoxy group and n is 3 or 4, a structure of the formula (V) wherein $R^6$ is isopropoxy group and n is 3 or 4, a structure of the formula (V) wherein $R^6$ is trifluoroethoxy group and n is 3 or 4, and a structure of the formula (V) wherein $R^6$ is phenoxy group and n is 3 or 4 are particularly preferable in a point that the side of the viscosity in the electrolyte can be suppressed.

As the isomer of the phosphazene derivative, it is preferable to be an isomer represented by the formula (VI) and of a phosphazene derivative represented by the formula (VII). In the formula (VI), $R^7$, $R^8$ and $R^9$ are not particularly limited as long as they are a monovalent substituent or a halogen element, and preferably includes the same monovalent substituents and halogen elements as described in $R^1$-$R^3$ of the formula (I). As the bivalent connecting group or bivalent element shown in $Y^7$ and $Y^8$ of the formula (VI) are preferably mentioned the same bivalent connecting groups and bivalent elements as described in $Y^1$-$Y^3$ of the formula (I). As the substituent shown in $X^2$ of the formula (VI) are preferably mentioned the same substituents as described in $X^1$ of the formula (I).

The isomer represented by the formula (VI) is an isomer of a phosphazene derivative represented by the formula (VII), and can be produced, for example, by adjusting a vacuum degree and/or a temperature in the formation of the phosphazene derivative represented by the formula (VII). The content of the isomer in the electrolyte (volume %) can be measured by the following measuring method.

<<Measuring Method>>

It can be determined by measuring a peak area of a sample through a gel permeation chromatography (GPC) or a high-speed liquid chromatography, comparing this peak area with an area per mol of the isomer previously measured to obtain a molar ratio, and further converting the ratio by volume considering a specific gravity.

As the phosphazene derivative of the formula (VII) are preferable those being relatively low in the viscosity and capable of well dissolving a support salt. As $R^7$-$R^9$, $Y^7$-$Y^9$ and $X^2$ in the formula (VII) are preferably mentioned the same as described in $R^7$-$R^9$, $Y^7$-$Y^9$ and $X^2$ of the formula (VI).

The flash point of the phosphazene derivative or the isomer thereof is not particularly limited, but is preferably not lower than 100° C., more preferably not lower than 150° C., further preferably not lower than 230° C., most preferably no ignition. The term "flash point" used herein concretely means a temperature that the flame spreads on the surface of the substance to cover at least 75% of the substance surface, which is a measure for checking a tendency of forming a combustible mixture with air. When the phosphazene derivative or the isomer thereof has a flash point of not lower than 100° C., the fire or the like is suppressed, and also it is possible to lower the risk of spreading the ignited flame on the surface of the electrolyte.

The ratio of the phosphazene derivative and/or the isomer thereof occupied in the electrolyte differs in accordance with the performances required for the electrolytic capacitor, but when the total amount of the solvent is the phosphazene derivative and/or the isomer thereof, an electrolytic capacitor having a highest flame retardance is obtained. Also, in order to improve the flame retardance by adding to the conventional electrolyte as a co-solvent, it is required to be used in an amount of not less than 3% by mass, preferably not less than 5% by mass, further preferably not less than 10% by mass.

As the organic solvent used in the electrolyte are mentioned an alcohol solvent such as ethylene glycol, propylene glycol, glycerin, methyl cellosolve or the like; an amide solvent such as N-methyl formamide, N-ethyl formamide, N,N-dimethyl formamide, N,N-diethyl formamide, N-methyl acetoamide, N-ethyl acetoamide, N,N-dimethyl acetoamide, N,N-diethyl acetoamide, N-methyl pyrrolidinone or the like; a lactone solvent such as γ-butyrolactone, β-butyrolactone, γ-valerolactone, δ-valerolactone or the like; a carbonate solvent such as ethylene carbonate, propylene carbonate, butylene carbonate or the like; a nitrile solvent such as 3-methoxypropionitrile or the like; a carbamate solvent such as N-methyloxazolidinone or the like; a urea solvent such as N,N'-dimethyl imidazolidinone or the like; a sulfolane solvent such as sulfolane, 3-methylsulfolane or the like; and so on. In the electrolytic capacitor of the invention, not more than 10% by mass of water may be added to the electrolyte in addition to the above organic solvent. Among the above organic solvents, it is preferable to have a dielectric constant at 25° C. of not less than 30, and γ-butyrolactone and ethylene glycol are particularly preferable.

As the solute used in the electrolyte can be used an alkali metal salt, an ammonium salt, an amine salt, a quaternary ammonium salt, a quaternary phosphonium salt or the like of inorganic acids and organic acids. As the inorganic acid are mentioned boric acid, carbonic acid, silicic acid, phosphoric acid, phosphorous acid, hypophosphorous acid, nitric acid, sulfuric acid, hydposulfurous acid, thiocyanic acid, cyanic acid, borohydrofluoric acid, phosphohydrofluoric acid, arsenic hydrofluoric acid, antimony hydrofluoric acid, perchloric acid and the like. As the organic acid are mentioned formic acid, acetic acid, oxalic acid, malonic acid, succinic acid, glutaric acid, adipic acid, pimelic acid, suberic acid, azelaic acid, sebacic acid, undecanedioic acid, dodecanedioic acid, brassilic acid, tetraecanedioic acid, pentadecanedioic acid, dimethyl malonic acid, diethyl malonic acid, dipropyl malonic acid, 3,3-dimethyl glutaric acid, 3-methyl adipic acid, 1,6-decane dicarboxylic acid, 1,2-cyclohexane dicarboxylic acid, maleic acid, citraconic acid, benzoic acid, phthalic acid, trimellitic acid, pyromellitic acid, salicylic acid, γ-resorcylic acid, p-nitrobenzoic acid, phenolic acid, picric acid, methanesulfonic acid, benzenesulfonic acid, trifluoromethanesulfonic acid and the like.

As the alkali metal are mentioned lithium, sodium, potassium and the like. As the amine are mentioned methylamine, ethylamine, propylamine, butylamine, ethylenediamine, monoethanol amine, dimethylamine, diethylamine, dipropylamine, ethylmethylamine, diphenylamine, diethanol amine, trimethylamine, triethylamine, tributylamine, 1,8-diazabicyclo(5,4,0)-undecene-7, triethanol amine and the like. As the quaternary ammonium are mentioned diethylammonium, triethylammonium, tripropylammonium, ethanol ammonium, diethanol ammonium, triethanol ammonium, cyclohexylammonium, piperidinium, 1,5-diazabicyclo(4,3,0)nonenium-5, 1,8-diazabicyclo(5,4,0)undecenium-7, tetramethylammonium, methyl triethylammonium, dimethyl diethylammonium, trimethyl ethylammonium, tetraethylammonium, tetrabutylammonium, N,N-dimethylpyrrolidinium, N-methyl-N-ethylpyrrolidinium, N,N-dimethylpiperidinium, benzyltrimethylammonium, N-ethylpyridinium, N,N'-dimethylimidazolium and the like. As the quaternary phosphonium are mentioned tetramethyl phosphonium, methyltriethyl phosphonium, tetraethyl phosphonium, tetrapropyl phosphonium, tetrabutyl phosphonium and the like. The amount of the solute is not more than a saturation concentration, preferably 0.1-40% by mass.

In the combination of the solvent and the solute, the organic solvent other than the alcohol, and the phosphazene derivative and the isomer thereof used in the invention dissolve only a slight amount of the alkali metal and ammonium salt. Therefore, in case of using the mixed solvent of organic solvent other than alcohol and the phosphazene derivative and/or the isomer thereof, it is preferable to use the amine salt, the quaternary ammonium salt and the quaternary phosphonium salt. Among them, the use of the quaternary ammonium salt or quaternary phosphonium salt as a solute is particularly preferable from a viewpoint of solubility and electrical conductance.

The positive electrode in the electrolytic capacitor is formed by arranging an insulating oxide layer on a surface of a base metal such as aluminum, tantalum or the like through anodic oxidation, and aluminum or the like is used in the negative electrode. These electrodes may be subjected to an etching, sintering or the like for increasing a contact area with the electrolyte. In this case, a total ratio of aluminum, tantalum and niobium in the positive electrode is preferable to be not less than 95% by mass.

Also, a separator is arranged between the positive electrode and the negative electrode for preventing short-circuiting. As the separator are mentioned a paper separator such as Manila paper, craft paper or the like, a polyolefin separator such as polypropylene, polyethylene or the like, an engineering plastic separator such as polyphenylene sulfide, polybutylene terephthalate or the like, and so on.

The electrolytic capacitor of the invention can be produced by a well-known method. For example, the electrolytic capacitor of the invention can be produced by impregnating an electrolyte into a winding element constructed with a positive electrode foil made from aluminum rendered into dielectric through surface oxidation, a negative electrode foil of aluminum opposed to the dielectric surface of the positive electrode foil and a separator interposed between the positive electrode foil and the negative electrode foil and sealing them in a casing. In the electrolytic capacitor of the invention, it is essential to include the aforementioned phosphazene derivative in the electrolyte.

The following examples are given in illustration of the invention and are not intended as limitations thereof.

EXAMPLES

An electrolyte is prepared according to a compounding recipe shown in Table 1, and then the combustibility and viscosity are measured by the following methods and further the flash point is measured by a well-known method. Moreover, the combustibility and viscosity are evaluated and measured with respect to a solution containing no support salt. The results are shown in Table 1.

(Evaluation of Combustibility)

It is evaluated by measuring combustion length and combustion time of a flame ignited under an atmosphere environment through a method arranging UL94HB method of UL (underwriting laboratory) standard. In this case, the ignitibility, combustibility, formation of carbide and phenomenon in secondary ignition are also observed based on the UL test standard. Concretely, the evaluation is carried out by sinking 1.0 mL of each of the electrolytes into an incombustible quartz fiber to prepare a test specimen of 127 mm×12.7 mm. The evaluation standards of the incombustibility, flame retardance, self-extinguishing property and combustibility are shown as follows.

Evaluation of incombustibility: A case that no ignition is caused even by adding a test flame (combustion length: 0 mm) is evaluated as incombustibility.

Evaluation of flame retardance: A case that the ignited flame does not arrive at a line of 25 mm of the apparatus and ignition is not observed in a falling object from a net is evaluated as flame retardance.

Evaluation of self-extinguishing property: A case that the ignited flame extinguishes between lines of 25-100 mm and ignition is not observed in the falling object from the net is evaluated as self-extinguishing property.

Evaluation of combustibility: A case that the ignited flame exceeds over a line of 100 mm is evaluated as combustibility.

(Viscosity)

The viscosity is determined by using a viscosity measuring device (R-type viscometer Model RE500-SL, made by Toki Sangyo Co., Ltd.) and conducting the measurement at each revolution rate of 1 rpm, 2 rpm, 3 rpm, 5 rpm, 7 rpm, 10 rpm, 20 rpm and 50 rpm for 120 seconds to measure a viscosity under the revolution rate when an indication value is 50-60% as an analytical condition.

Also, the electrolyte is impregnated into the element for the electrolytic capacitor, which is placed in an outer casing and further an opening portion of the outer casing is sealed with a sealing material to prepare an aluminum electrolytic capacitor. In the prepared aluminum electrolytic capacitor, mass of the aluminum electrode is 1.18 g, and mass of the separator is 0.36 g, and mass of the electrolyte is 0.82 g, and a size of the electrolytic capacitor is 12.5 mmφ×20 mm. With respect to the thus prepared aluminum electrolytic capacitor, the spark voltage, static capacity, dielectric tangent and leak current are measured by well-known methods. The results are shown in Table 1.

TABLE 1

| | Composition of electrolyte | | | | | | | | | |
|---|---|---|---|---|---|---|---|---|---|---|
| | solvent (parts by mass) | solute (parts by mass) | phosphazene (parts by mass) | Combustibility | Viscosity of solvent (mPa·s) | Flash point (° C.) | Spark voltage (V) | Static capacity (µF) | Dielectric tangent (—) | Leak current (µA) |
| Conventional Example | GBL *1 40 | TEAM *3 20 | TEP *4 40 | self-extinguishing property | 1.2 | 101 | 117 | 962 | 0.10 | 18 |
| Example 1 | GBL 40 | TEAM 20 | EO *5 40 | incombustibility | 1.6 | >150 | 164 | 973 | 0.10 | 17 |
| Example 2 | EG *2 40 | TEAM 20 | EO 40 | incombustibility | 7.3 | >150 | 132 | 996 | 0.18 | 21 |
| Example 3 | GBL 70 | TEAM 20 | EO 10 | flame retardance | 1.7 | >150 | 237 | 970 | 0.06 | 14 |
| Example 4 | EG 70 | TEAM 20 | EO 10 | flame retardance | 11.3 | >150 | 203 | 983 | 0.13 | 15 |
| Example 5 | GBL 40 | TEAM 20 | PhOF *6 40 | incombustibility | 2.0 | >150 | 204 | 958 | 0.09 | 17 |
| Example 6 | GBL 40 | TEAM 20 | TFEOF *7 40 | incombustibility | 1.2 | >150 | 187 | 1006 | 0.11 | 19 |
| Example 7 | GBL 70 | TEAM 20 | TFEOF 10 | flame retardance | 1.9 | >150 | 246 | 972 | 0.05 | 12 |
| Example 8 | GBL 70 | TEAM 20 | PhOF 10 | flame retardance | 1.8 | >150 | 211 | 976 | 0.07 | 14 |
| Comparative Example 1 | GBL 80 | TEAM 20 | — | incombustibility | 1.7 | 98 | 85 | 983 | 0.06 | 14 |
| Comparative Example 2 | EG 80 | TEAM 20 | — | incombustibility | 20.0 | 116 | 75 | 976 | 0.19 | 13 |

*1 GBL: γ-butyrolactone, dielectric constant at 25° C. = 39.1
*2 EG: ethylene glycol, dielectric constant at 25° C. = 37.7
*3 TEAM: tetraethyl ammonium maleate
*4 TEP: triethyl phosphate
*5 EO: a chain phosphazene derivative of formula (I) in which $Y^1$-$Y^3$ are O, $R^1$-$R^3$ are —$CH_2CH_3$ and $X^1$ is —$P(O)(OCH_2CH_3)_2$, viscosity at 25° C.: 5.8 mPa·s
*6 PhOF: phenoxypentafluorocyclotriphosphazene, a cyclic phosphazene compound of formula (II) in which n is 3 and one of six $R^4$s is phenoxy group (PhO—) and the remaining five are fluorine, viscosity at 25° C.: 1.7 mPa·s
*7 TFEOF: tetrafluoroethoxy pentafluorocyclotriphosphazene, a cyclic phosphazene compound of formula (II) in which n is 3 and one of six $R^4$s is tetrafluoroethoxy group and the remaining five are fluorine, viscosity at 25° C.: 1.8 mPa·s As seen from Table 1, the safety of the electrolyte can be largely improved by including the phosphazene into the electrolyte and hence the safety of the electrolytic capacitor can be considerably improved.

INDUSTRIAL APPLICABILITY

According to the invention, the electrolytic capacitor having a high safety can be provided by including the phosphazene derivative and/or the isomer of the phosphazene derivative into the electrolyte even if the electrolyte leaks out to outside.

The invention claimed is:

1. An electrolytic capacitor comprising a positive electrode provided with an insulating oxide layer formed through anodic oxidation, a negative electrode, a separator and an electrolyte containing a solute in an organic solvent, characterized in that the electrolyte contains not less than 3% by mass of a phosphazene derivative and/or an isomer of a phosphazene derivative.

2. An electrolytic capacitor according to claim 1, wherein the electrolyte contains not less than 5% by mass of the phosphazene derivative and/or the isomer of the phosphazene derivative.

3. An electrolytic capacitor according to claim 2, wherein the electrolyte contains not less than 10% by mass of the phosphazene derivative and/or the isomer of the phosphazene derivative.

4. An electrolytic capacitor according to claim 1, wherein the phosphazene derivative has a viscosity at 25° C. of not more than 100 mPa·s (100 cP) and is represented by the following formula (I) or (II):

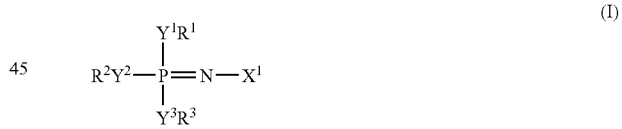

(I)

(wherein $R^1$, $R^2$ and $R^3$ are independently a monovalent substituent or a halogen element, $X^1$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^1$, $Y^2$ and $Y^3$ are independently a bivalent connecting group, a bivalent element or a single bond)

$$(NPR^4_2)_n \quad \text{(II)}$$

(wherein $R^4$ is independently a monovalent substituent or a halogen element, and n is 3-15).

5. An electrolytic capacitor according to claim 4, wherein the phosphazene derivatives of the formula (II) is represented by the following formula (III):

$$(NPF_2)_n \quad \text{(III)}$$

(wherein n is 3-13).

6. An electrolytic capacitor according to claim 4, wherein the phosphazene derivatives of the formula (II) is represented by the following formula (IV):

$$(NPR^5{}_2)_n \quad (IV)$$

(wherein $R^5$ is independently a monovalent substituent or fluorine provided that at least one of all $R^5$s is a fluorine-containing monovalent substituent or fluorine and all $R^5$s are not fluorine, and n is 3-8).

7. An electrolytic capacitor according to claim 1, wherein the phosphazene derivative is a solid at 25° C. and is represented by the following formula (V):

$$(NPR^6{}_2)_n \quad (V)$$

(wherein $R^6$ is independently a monovalent substituent or a halogen element and n is 3-6).

8. An electrolytic capacitor according to claim 1, wherein the isomer is represented by the following formula (VI) and is an isomer of a phosphazene derivative represented by the following formula (VII):

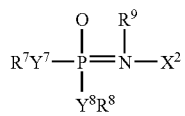
(VI)

(in the formulae (VI) and (VII), $R^7$, $R^8$ and $R^9$ are independently a monovalent substituent or a halogen element, $X^2$ is a substituent containing at least one element selected from the group consisting of carbon, silicon, germanium, tin, nitrogen, phosphorus, arsenic, antimony, bismuth, oxygen, sulfur, selenium, tellurium and polonium, and $Y^7$ and $Y^8$ are independently a bivalent connecting group, a bivalent element or a single bond).

9. An electrolytic capacitor according to claim 1, wherein the electrolyte contains an organic solvent having a dielectric constant at 25° C. of not less than 30.

10. An electrolytic capacitor according to claim 1, wherein the electrolyte contains γ-butyrolactone and/or ethylene glycol.

11. An electrolytic capacitor according to claim 1, wherein in the positive electrode, a total ratio of an element(s) selected from the group consisting of aluminum, tantalum and niobium is not less than 95% by mass.

* * * * *